US011958663B2

(12) United States Patent
Park

(10) Patent No.: US 11,958,663 B2
(45) Date of Patent: Apr. 16, 2024

(54) CAP DEVICE, CONTAINER ASSEMBLY PROVIDED WITH CAP DEVICE, AND LOCKING DEVICE THEREFOR

(71) Applicant: COLEDY INC., Seoul (KR)

(72) Inventor: Kyungdo Park, Seoul (KR)

(73) Assignee: COLEDY, INC., Seoul (KR)

( * ) Notice: Subject to any disclaimer, the term of this patent is extended or adjusted under 35 U.S.C. 154(b) by 0 days.

(21) Appl. No.: 17/620,624

(22) PCT Filed: Jun. 17, 2020

(86) PCT No.: PCT/KR2020/007838
§ 371 (c)(1),
(2) Date: Dec. 17, 2021

(87) PCT Pub. No.: WO2020/256402
PCT Pub. Date: Dec. 24, 2020

(65) Prior Publication Data

US 2022/0258930 A1 Aug. 18, 2022

(30) Foreign Application Priority Data

Jun. 18, 2019 (KR) ........................ 10-2019-0072538
May 6, 2020 (KR) ........................ 10-2020-0053851

(51) Int. Cl.
*B65D 47/12* (2006.01)
*A61J 1/03* (2023.01)
(Continued)

(52) U.S. Cl.
CPC .............. *B65D 47/123* (2013.01); *A61J 1/03* (2013.01); *A61J 7/0076* (2013.01); *B65D 51/24* (2013.01); *B65D 55/022* (2013.01); *B65D 83/049* (2013.01)

(58) Field of Classification Search
CPC .... B65D 47/123; B65D 83/049; B65D 51/24; B65D 55/022; A61J 7/0076; A61J 1/03
See application file for complete search history.

(56) References Cited

U.S. PATENT DOCUMENTS 3,850,327 A * 11/1974 Robinson ............... B65D 50/04 215/206
4,848,615 A * 7/1989 Friedrich ............... B65D 41/48 215/254
(Continued)

FOREIGN PATENT DOCUMENTS

EP 0 544 381 9/1996
JP 11-105948 4/1999
(Continued)

OTHER PUBLICATIONS

International Search Report for PCT/KR2020/007838 dated Sep. 17, 2020 and its English translation from WIPO (now published as WO 2020/256402).
(Continued)

*Primary Examiner* — Michael Collins
(74) *Attorney, Agent, or Firm* — Ladas & Parry, LLP

(57) ABSTRACT

The present invention relates to a container assembly including a container body for accommodating contents and a cap device detachably installed on the container body, and the cap device includes a first coupling part detachably coupled to the container body and a pass-through device through which the contents accommodated in the container body pass. The cap device includes a holder on which the first coupling part is formed and a cap body including the pass-through device, the holder includes a cylindrical inner wall and a bottom part extending from a bottom of the cylindrical inner wall along an outer circumference thereof, and the first coupling part is formed on an inner circumfer-
(Continued)

ential surface of the cylindrical inner wall and screw-coupled to the neck part.

15 Claims, 11 Drawing Sheets

(51) Int. Cl.

| | |
|---|---|
| *A61J 7/00* | (2006.01) |
| *B65D 51/24* | (2006.01) |
| *B65D 55/02* | (2006.01) |
| *B65D 83/04* | (2006.01) |

(56) References Cited

U.S. PATENT DOCUMENTS

| | | | | |
|---|---|---|---|---|
| 5,564,580 | A * | 10/1996 | Hamilton | B65D 50/046 215/221 |
| 5,979,680 | A * | 11/1999 | Farside | B65D 50/046 215/354 |
| 5,992,657 | A * | 11/1999 | Friedman | B65D 50/046 215/209 |
| 6,016,930 | A * | 1/2000 | Mathes | B65D 50/046 215/274 |
| 7,168,461 | B2 * | 1/2007 | DeJonge | B65D 51/246 141/22 |
| 9,669,989 | B2 * | 6/2017 | Sanders | A61J 1/03 |
| 10,294,010 | B2 * | 5/2019 | Desset-Brethes | B65D 83/06 |
| 10,470,976 | B2 * | 11/2019 | Warden | B65D 50/04 |
| 10,479,588 | B2 * | 11/2019 | Sanders | A61J 1/1412 |
| 11,053,040 | B1 * | 7/2021 | Abehasera | A61L 9/00 |
| 11,576,842 | B2 * | 2/2023 | Park | A61J 7/0076 |
| 11,772,879 | B2 * | 10/2023 | Park | B65D 83/0427 221/175 |
| 2005/0029154 | A1 * | 2/2005 | Kahn | A61J 7/0076 206/540 |
| 2006/0207996 | A1 * | 9/2006 | Marteau | B65D 83/0409 221/228 |
| 2009/0235701 | A1 | 9/2009 | Lin | |
| 2013/0116818 | A1 * | 5/2013 | Hamilton | A61J 7/04 221/277 |
| 2020/0085686 | A1 * | 3/2020 | Aliakbarian | A61J 7/0076 |
| 2021/0030626 | A1 * | 2/2021 | Medhal | A61J 7/0436 |

FOREIGN PATENT DOCUMENTS

| | | |
|---|---|---|
| KR | 20-0280761 | 7/2002 |
| KR | 10-2012-0096798 | 8/2012 |
| KR | 10-2015-0008091 | 1/2015 |
| KR | 10-2018-0010157 | 1/2018 |
| WO | 2018/080239 | 5/2018 |

OTHER PUBLICATIONS

Written Opinion of the International Searching Authority for PCT/KR2020/007838 dated Sep. 17, 2020 and its English translation by Google Translate (now published as WO 2020/256402).

Partial Supplementary Search Report dated Aug. 21, 2023 for European Patent Application No. 20827772.3.

* cited by examiner

CAP DEVICE, CONTAINER ASSEMBLY PROVIDED WITH CAP DEVICE, AND LOCKING DEVICE THEREFOR

CROSS-REFERENCE TO RELATED APPLICATIONS

The present application is the national stage of International Patent Application No. PCT/KR2020/007838 filed on Jun. 17, 2020, which claims the priority to Korean Patent Application No. 10-2019-0072538 filed in the Korean Intellectual Office on Jun. 18, 2019, and Korean Patent Application No. 10-2020-0053851 filed in the Korean Intellectual Office on May 6, 2020, the entire contents of which are incorporated herein by reference.

TECHNICAL FIELD

The present invention relates to a cap device and a locking device therefor, and more specifically, to a cap device detachably coupled to a container, a container assembly including the cap device, and a locking device therefor.

BACKGROUND ART

Generally, medicines, health supplements such as vitamins, food products such as small candies and snacks, detergents, cosmetics, and the like are manufactured in the form of solid, such as, pills and capsules, powder, or liquid contents (hereinafter referred to as "contents") and are accommodated in containers.

Taking or using the right amount is important in order to prevent overuse or misuse while maximizing the efficacy of contents. The contents are sold in a state in which the contents are accommodated in a predetermined storage container, and the conventional content storage container includes a container body, in which contents are accommodated, and a lid coupled to an inlet of the container body to be openable and closable.

FIG. 11 is a view illustrating one form of a conventional medicine storage container, and a container 200 includes a container body 210, which accommodates and stores contents and has a quadrangular container shape, and a neck part 220 disposed on the container body 210. An inner portion of the neck part 220 is a path, through which the contents accommodated in the container body 210 are discharged, and a screw thread, by which the lid is screw-coupled, is formed on an outer portion of the neck part 220.

According to FIG. 11, the cylindrical neck part 220, of which a cross-sectional area is smaller than that of the container, is formed on the container body 210 to extend therefrom. The inner portion of the cylindrical neck part 220 is formed as an opening part of which both sides are open, one side (lower portion) communicates with the container body 210, and the other side (upper portion) is open in an outward direction of the container. The open part is a path through which a pill is discharged, and a screw thread 221 for opening or closing the lid 400 is formed on an outer circumferential surface of the cylindrical neck part 220.

Meanwhile, the lid 400 has a cylindrical inner circumferential surface to be in contact with the outer circumferential surface of the neck part 220, a screw thread corresponding to the screw thread 221 is formed on the inner circumferential surface the lid 400, and thus the lid is screw-coupled to the neck part. Opening or closing of a general medicine container is controlled in a method of rotating the lid with respect to the neck part of the container 200 to screw-couple the screw thread formed on the outer circumferential surface of the neck part and the screw thread formed on the inner circumferential surface of the lid or releasing the screw-coupling.

There is an attempt to prevent an amount other than a required amount of the contents from being discharged so as to promote convenience when taking the medicine and to cause a right amount to be taken by accurately quantifying a one-time discharge amount of the medicine accommodated in a container. As an example, a quantitative discharge container is proposed in Korean Patent Publication No. 10-2012-0096798.

Meanwhile, since it is a waste of resources to unconditionally discard conventional storage containers and medicine or health food storage containers which have already been produced and sold, rather than replacing the conventional storage containers with quantitative discharge containers, a device, which is simply installed on the conventional storage container to discharge a right amount of the contents or to provide various other functions to the storage container as necessary, is required.

Technical Problem

The present invention is directed to providing a cap device which is simply and detachably coupled to a general storage container and includes a pass-through device. The present invention is also directed to providing a cap device which has high assemblability and compatibility and is capable of providing various add-ons to a content storage container and a container assembly.

The present invention is also directed to providing a locking device capable of preventing a cap device detachably installed on a container from being unintentionally separated from the container so as to improve the reliability and safety of a container assembly.

Technical Solution

One aspect of the present invention provides a cap device which is detachable from and attachable to a container for accommodating contents, the cap device including a first coupling part detachably coupled to the container, and a pass-through device through, which the contents accommodated in the container, pass.

The cap device may be coupled to a content storage container including the container for accommodating the contents and a lid, and the cap device may include a second coupling part to be coupled to the lid.

The first coupling part may be a screw thread which is rotationally coupled to a screw thread formed on a neck part which has an open part formed in an upper portion of the container.

The cap device may include a holder on which the first coupling part is formed and a cap body including the pass-through device. The holder may include a cylindrical inner wall and a bottom part extending from a bottom of the cylindrical inner wall along an outer circumference thereof, and the first coupling part is formed on an inner circumferential surface of the cylindrical inner wall and rotationally coupled to the neck part.

The first coupling part may be the screw thread formed on the inner circumferential surface of the cylindrical inner wall and may be engaged with, rotationally coupled to, and released from the screw thread formed on an outer circumferential surface of the neck part.

The cap body may include a case and the pass-through device accommodated in the case, and a bottom protruding part inserted into an open part formed by the cylindrical inner wall may be formed on a bottom of the case.

Another aspect of the present invention provides a container assembly including a container configured to accommodate contents and a cap device detachably installed on the container.

The cap device may include a first coupling part detachably coupled to the container and a pass-through device through which the contents accommodated in the container pass.

The first coupling part of the cap device may be rotationally coupled to a screw thread formed on an outer circumferential surface of a neck part of the container.

The cap device may include a holder on which the first coupling part is formed and a cap body including the pass-through device. The holder may include a cylindrical inner wall and a bottom part extending from a bottom of the cylindrical inner wall along an outer circumference thereof, and the first coupling part may be formed on an inner circumferential surface of the cylindrical inner wall and rotationally coupled to the neck part.

The container assembly may further include a lid, the lid may be rotationally coupled to an outer circumferential surface of an upper portion of the cap device, and the lid may be rotationally coupled to an outer circumferential surface of the neck part of a container in a state in which the cap device is separated from the container.

The container assembly may further include a locking device. The locking device may include a loop-shaped band part, which is vertically movable in a sliding manner along an outer circumference of the container, and a rotation-preventing protrusion coupled to the band part.

A locking part, which prevents relative movement of the cap device with respect to the container, may have a structure in which a screw step of the cap device is hooked on a screw step of the neck part of the container to restrict opening.

Still another aspect of the present invention provides a locking device, which prevents separation between a container for accommodating contents and a cap device detachably coupled to the container, the locking device including a band part having a loop shape and a locking part which is coupled to the band part and prevents relative movement of the cap device with respect to the container body.

The container body may be a container having a polygonal or elliptical column shape. Since the band part having the loop shape may have an inner circumferential surface in contact with an outer circumference of the container body and has a predetermined strength, the band part may not move along a circumference of the container body but may slidably move in a height direction of the container body.

The locking part may be a rotation prevention protruding part and may be fixedly inserted into the cap device to restrict rotational movement of the cap device with respect to the container body.

The locking part may include a hook extending to protrude upward from an upper end of the band part, and the hook may be integrally formed with the band part and hook-coupled to the cap device to restrict rotation of the cap device.

The locking device may be for a cap device which is rotatably coupled to the container and opens or closes an open part formed in the neck part of the container, and the band part may be insertion-coupled to the container body, may be slidably movable along the container body, and may not rotate with respect to the container body.

The locking device may be is integrally formed of a metal or plastic, and a band, which has a predetermined strength and relatively wide area, may maintain a shape, and a thin hook may be deformed due to elasticity at the same time. That is, when viewed from a side, the band has a relatively wide width so that an area thereof is large, however, the hook has a narrow width and a relatively high height to have elasticity. In this case, a thickness of the band may be greater than a thickness of the hook.

Advantageous Effects

A cap device having the above-described structure of the present invention is installed on a conventional general storage container, which does not have a quantitative discharge function, so that contents can be quantitatively discharged.

According to one aspect of the present invention, a cap device, of which assembly is simple and compatibility with a conventional container is high, can be provided so that various functions can be provided to the conventional container.

According to another aspect of the present invention, since a cap device can be prevented from being released from coupling with a container assembly on which the cap device is installed, reliability and safety of a product are improved.

In a locking device of the present invention, since locking and release are facilitated, user convenience is excellent, and manufacturing costs are reduced.

MODES OF THE INVENTION

Figure 1:
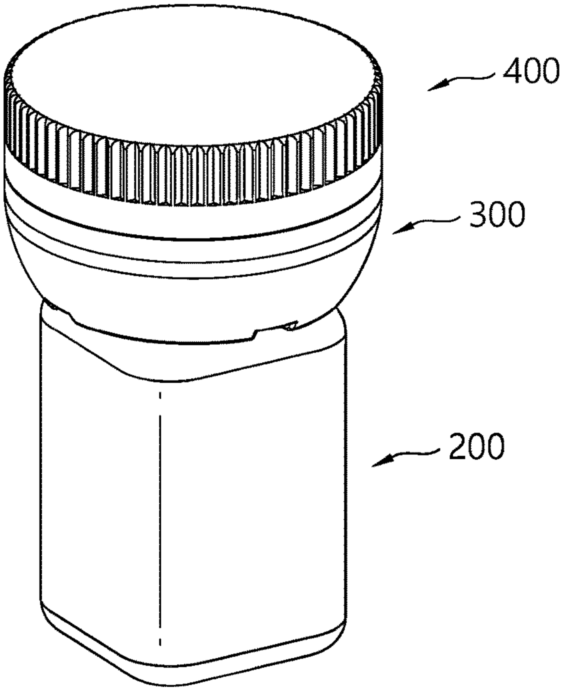
FIG. 1 is a perspective view illustrating a state in which a lid of a storage container assembly, in which a cap device (pass-through device) is installed, closes a storage container.

Exemplary embodiments of the present invention will be described with reference to the accompanying drawings in order to sufficiently understand the present invention. The embodiments of the present invention may be modified into various forms, and the scope of the present invention should not be interpreted as being limited to the embodiments which will described in detail below. Shapes and the like of elements in the drawings may be exaggerated in order to clearly emphasize descriptions thereof. In the present specification, "being coupled" or "being connected" includes not only two elements that are directly coupled or connected but also two elements that are indirectly coupled or connected with another element interposed therebetween. In addition, detailed descriptions about known functions and components will be omitted when it is determined that the gist of the present invention is unnecessarily obscured.

Hereinafter, exemplary embodiments of the present invention will be described in detail with reference to FIGS. 1 to 10. A cap device and a locking device of the present invention may be applied to various content storage or accommodation containers, may provide various functions to the container, and may be used to prevent the coupling of the container and the cap device from being released unintentionally.

Figure 11:
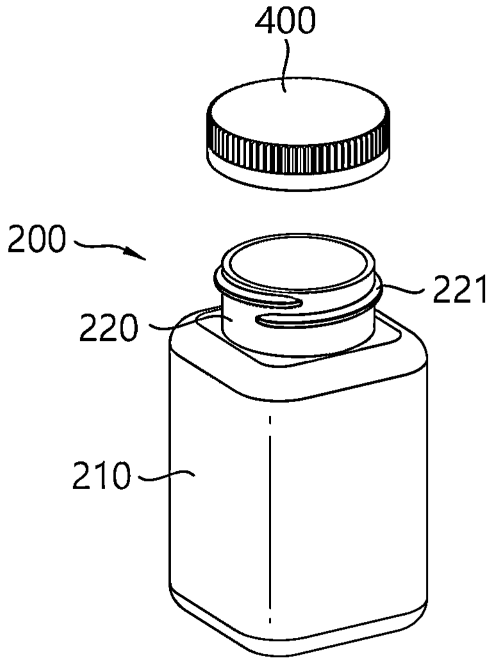
FIG. 11 is a perspective view illustrating a conventional storage container including a container body having a quadrangular columnar shape.

The cap device according to one embodiment of the present invention is a cap device which is simply installed on one of the conventional storage containers as necessary as in FIG. 11 so as to allow quantitative discharge of contents and/or the container to be provided as an Internet of Things (IoT) device. When a cap device 300 according to one embodiment of the present invention is installed on a neck part of a general type container which does not have a quantitative discharge function or other various IoT functions, the function of quantitatively discharging the contents may be performed, and/or data about discharge/intake of the contents such as a discharge amount, a time, and the number of times of the contents may be collected. In addition, the cap device of the present invention is not limited to having the function, and it is sufficient for the cap device to be detachably coupled to the container and to perform an arbitrary function, but, hereinafter, an example of a medicine container equipped with the cap device for quantitative discharge will be described.

FIG. 1 is a perspective view illustrating a storage container assembly according to one embodiment of the present invention. According to FIG. 1, the storage container assembly may include a container 200 and the cap device 300 and may further include a lid 400.

The cap device 300 according to the embodiment of the present invention is for a content storage container including the container 200 for accommodating the contents and the lid 400. The cap device 300 is detachably installed on the container 200 for accommodating contents 1 and, along with the container 200, constitutes the container assembly. The lid 400 is coupled to or separated from the cap device 300 to close or open the container assembly. Specifically, the cap device 300 is installed on the container 200, and the lid 400 is coupled to an upper end portion of the cap device 300.

Figure 2:
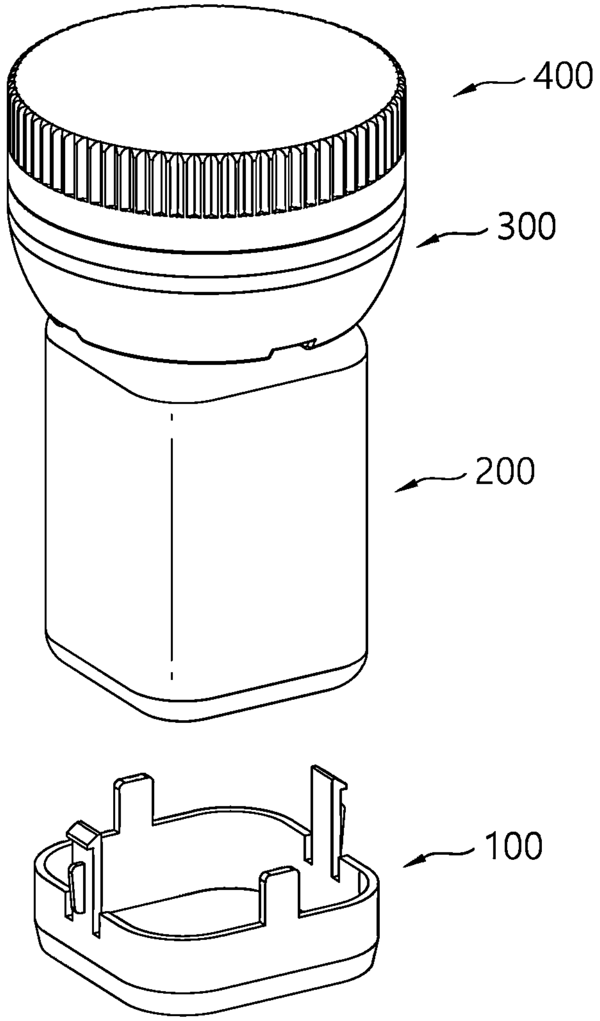
FIG. 2 is a perspective view illustrating a state in which a locking device is disposed below a container body of the storage container assembly of FIG. 1 in order to apply the locking device to the storage container assembly according to one embodiment of the present invention.
Figure 3:
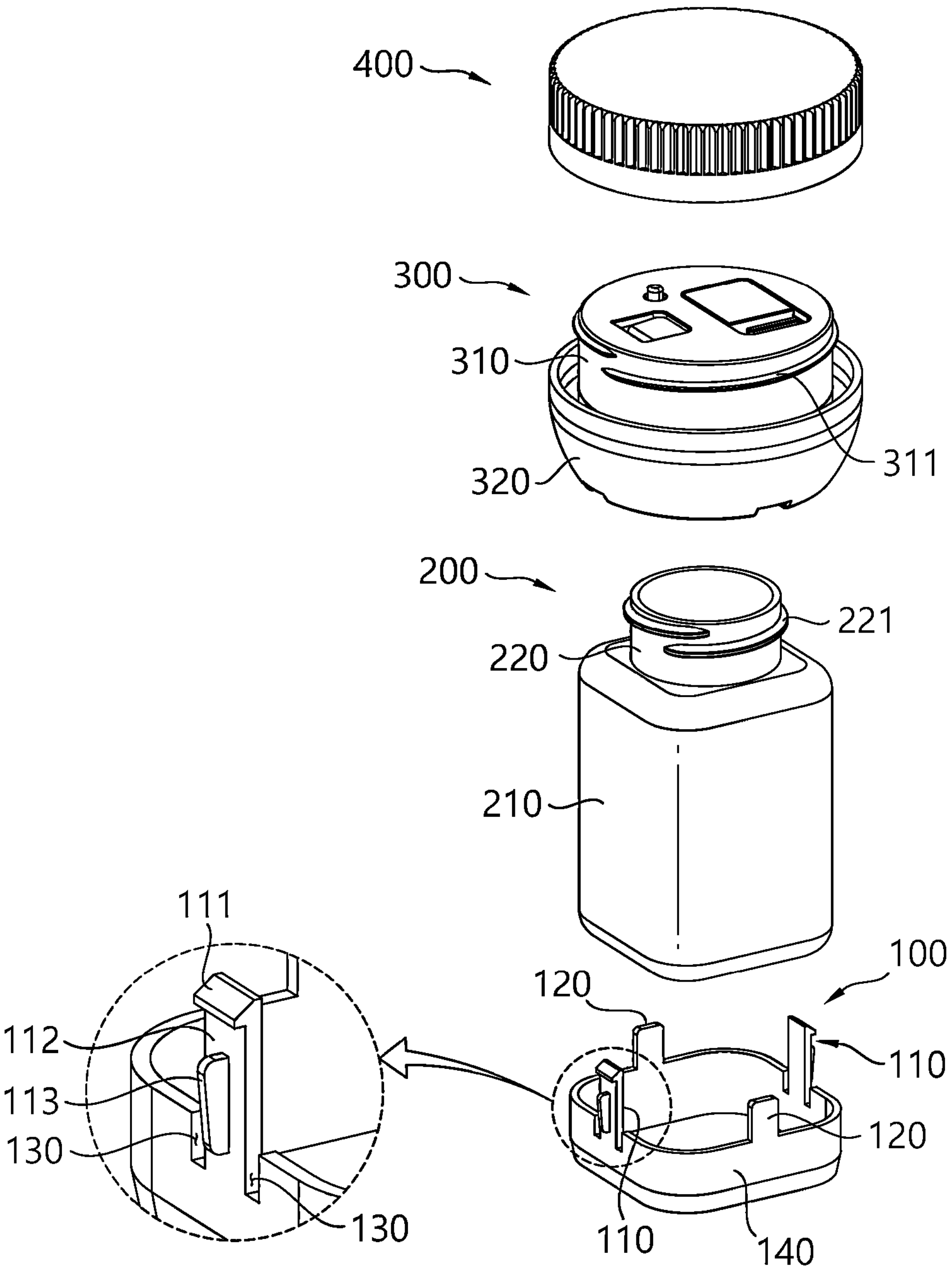
FIG. 3 is an exploded perspective view illustrating the storage container assembly and the locking device coupled to the storage container assembly of the present invention.

Referring to FIGS. 2 and 3, the container 200 includes a container body 210 formed as a container which accommodates and stores the contents and has a quadrangular columnar shape and a neck part 220 coupled to an upper end of the container body 210. In the container body 210 having the quadrangular container shape, a lateral cross-sectional area decreases in a shoulder part disposed at an upper end of the container body 210, and the cylindrical neck part 220 is formed on the shoulder part to extend from the shoulder part. An inner circumferential surface of the neck part 220 forms an open part which is a path through which the contents 1 are discharged, and a screw thread 221, which is screw-coupled to the lid, is formed on an outer circumferential surface of the cylindrical neck part 220. Basically, a structure of the container and the lid is the same as a structure of a general storage container of FIG. 11.

The cap device 300 according to one embodiment of the present invention includes a first coupling part detachably coupled to the container 200 and a pass-through device through which the contents accommodated in the container pass, may provide various functions to the container, and as necessary, may be easily separated therefrom and installed on another container. The cap device is installed on an upper open part of a conventional storage container body which does not have a quantitative discharge function so that quantitative discharge of the contents is allowed.

Hereinafter, referring to FIGS. 3 to 8, the cap device 300 according to one embodiment of the present invention will be described, and the cap device 300 includes a cap body 310 and a holder 320.

The cap body 310 may include a case 315 and the pass-through device installed in the case 315 and may further include electronic components such as a sensor, a battery, a communication module, and a printed circuit board.

The holder 320 includes an outer wall, an inner wall having a cylindrical shape, and a bottom part connecting the outer wall and the inner wall at a lower portion, a seating part is formed between the inner wall and the outer wall on the bottom part, and the cap body is seated on the seating part. The outer wall may have a cylindrical shape of which a diameter decreases toward the lower portion but is not limited thereto, and it is sufficient for the outer wall to have a shape surrounding the seating part. The holder 320 is preferably formed as one part but is not limited thereto.

An inner circumferential surface of the cylindrical inner wall of the holder 320 is formed to correspond to the outer circumferential surface of the neck part 220 of the container to be rotationally coupled. The holder 320 and the neck part 220 are coupled by rotational coupling between the screw threads formed to correspond to each other and are released from the coupling by being relatively rotated in the opposite direction. In this case, the coupling by screw-rotation is stopped at a designated portion of the container. That is, as the screw-rotation of the first coupling part of the cap device is stopped at the designated portion of the container, in a state in which the cap device 300 is screw-coupled to the container, a front moving member (which will be described below) may be disposed at a specific portion, for example, an upper portion of a flat portion of a quadrangular container, of the container body. There is an effect in that a pill, which moves to the front moving member along an inner portion of the body, smoothly slides, or a hand conveniently holds the container body.

In the embodiment of the present invention, a screw thread 321 formed on the inner circumferential surface of the inner wall of the holder 320 and the screw thread 221 formed on the outer circumferential surface of the neck part 220 of the container are screw-coupled to each other by being relatively rotated but are not limited thereto, a cylindrical part of the cap device may also be rotationally coupled to the inner circumferential surface of the neck part. For example, without the holder, all or some of a lower portion of the case 315 of the cap body 310 may be formed to have a cylindrical shape and inserted into and screw-coupled to the inner circumferential surface of the neck part 220 by being rotated using the screw thread formed on the inner circumferential surface of the neck part.

A structure of the cap body 310 will be described in detail with reference to FIGS. 4 to 8. The cap body 310 is seated on the seating part formed between the inner wall and the outer wall of the holder 320, and a bottom protruding part 380 formed on a lower portion of the cap body 310 is inserted into and closes an opening part formed by the cylindrical inner wall of the holder 320.

A stepped part 391 protruding toward a center of the cylindrical inner wall is formed on an upper end of the inner wall of the holder 320 to provide a gap between the bottom protruding part 380 and the inner circumferential surface of the inner wall.

A pair of holder hooks 390, which are disposed opposite to each other, are formed to protrude upward from the inner wall of the holder 320. The holder hooks 390 formed to protrude upward from the inner wall of the holder 320 are inserted into and hook-coupled to concave parts 383 formed in upper ends of both sides of the bottom protruding part 380 of the cap body. Hooking steps, to which the holder hooks 390 are hook-coupled, are formed on the upper ends of the concave parts (see FIGS. 6 and 7).

The cap body 310 includes the case 315, the pass-through device accommodated in the case 315, and various parts, a screw thread 311, to which a screw thread 411 of the lid 400 is screw-coupled by being relatively rotated, is formed on an outer circumferential surface of an upper portion of the cap body 310.

Figure 4:
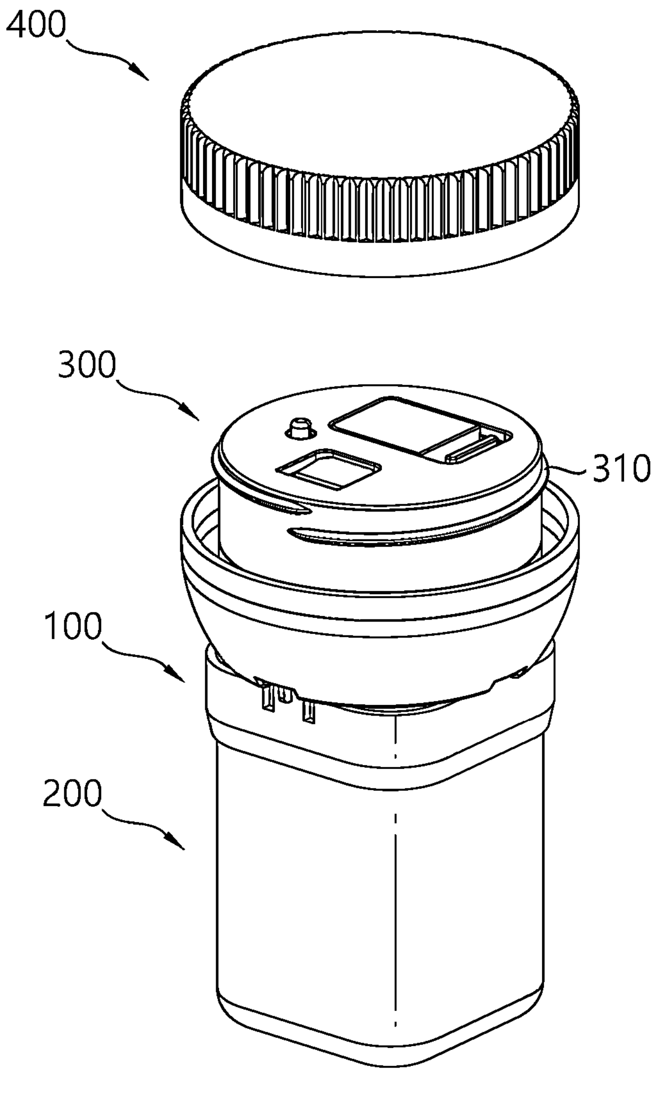
FIG. 4 is a perspective view illustrating a state in which the lid (400) is opened in a state in which the locking device is coupled to the storage container assembly according to one embodiment of the present invention.
Figure 5:
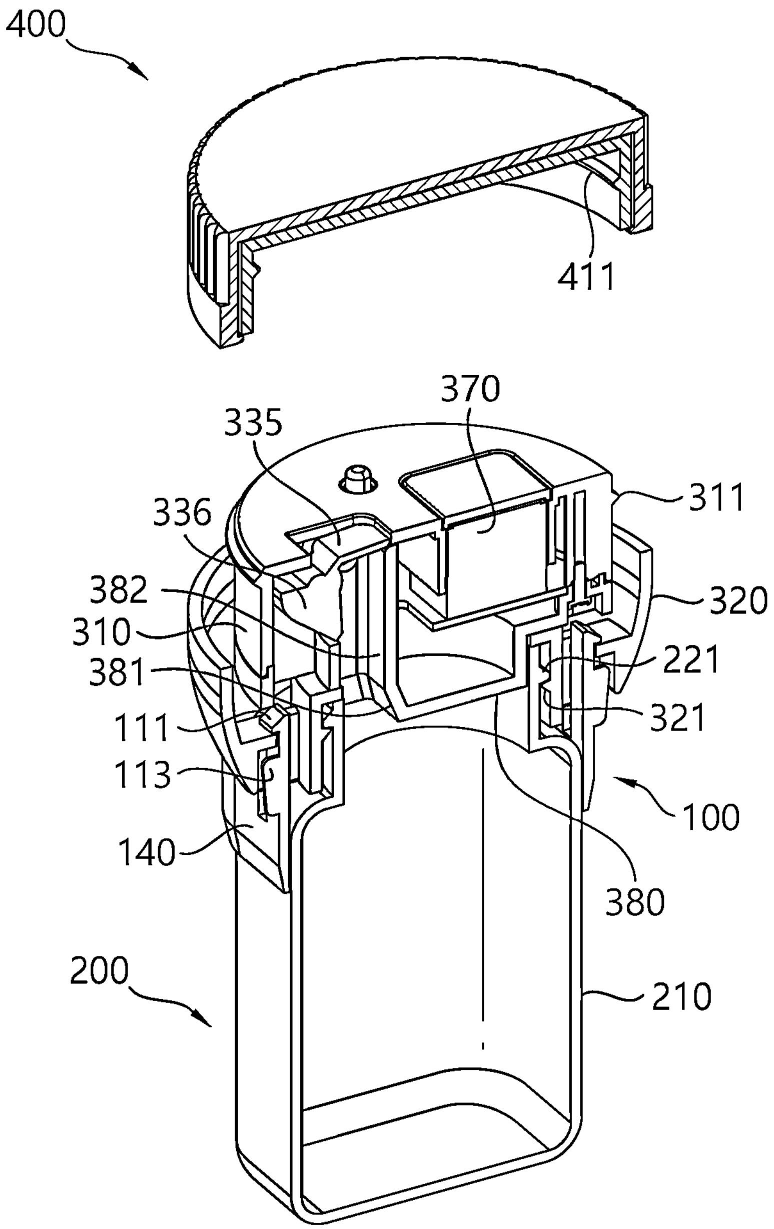
FIG. 5 is a perspective view illustrating a longitudinal cross-section in a state in which the storage container assembly is coupled to the locking device shown in FIG. 4.
Figure 6:
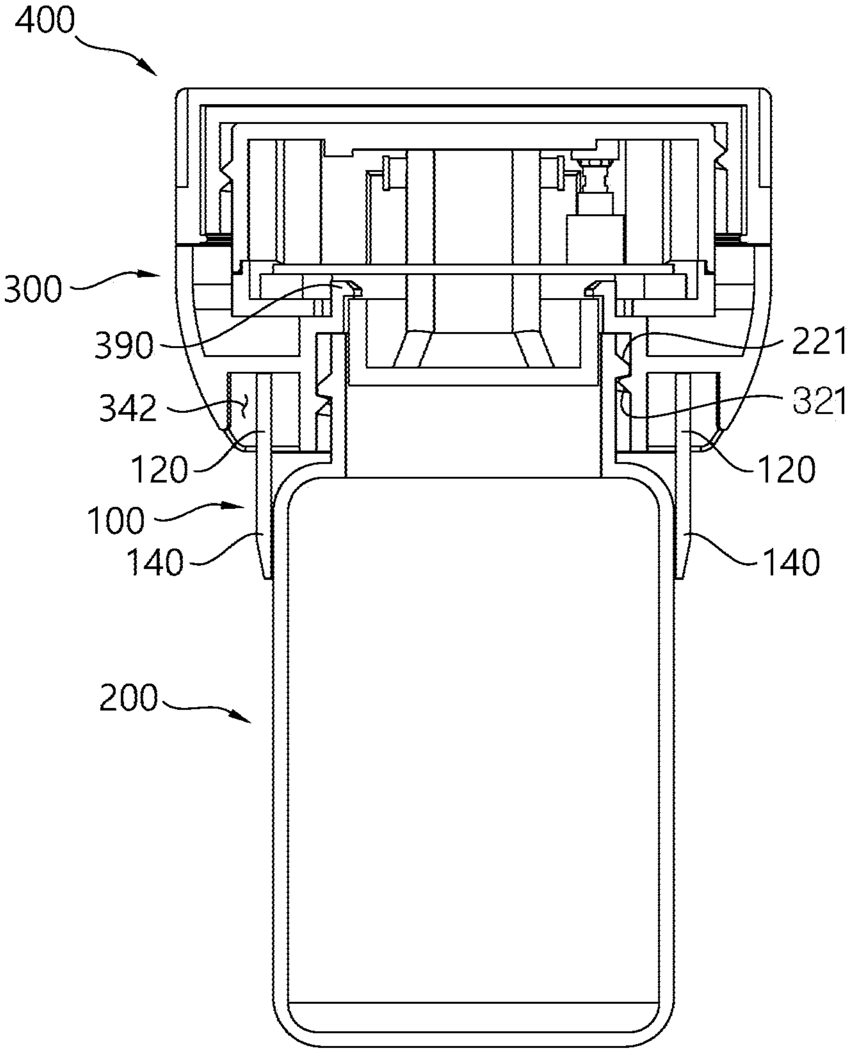
FIG. 6 is a cut-away view illustrating the longitudinal cross-section in a direction perpendicular to the cross-section of FIG. 5.

Referring to FIGS. 4 and 5, the case 315 of the cap body 310 is a cylindrical case having a side wall, an upper surface, and a lower surface but is not limited thereto. Particularly, the side wall of the case may have a polygonal column shape instead of the cylindrical shape. However, in this case, coupling with the lid may not be rotational coupling.

A through hole, through which the contents pass, is formed at one side of the upper surface of the case 315, and the pass-through device for quantitative passing of the contents is formed over the through hole and the lower portion thereof.

Meanwhile, each of the container 200, the holder 320 of the cap device 300, the case 315, and the like may be formed as one part through injection molding of plastic, for example, polycarbonate or acrylonitrile-butadiene-styrene (ABS) plastic but is not limited thereto. In addition, an electronic part 370 including a communication module or processor and a switch 371 are accommodated in the case 315 of the cap body 310.

The pass-through device includes path parts 381, 382, and 386 forming a path 385, which guides the contents accommodated in the container body 210 of the container to move to the through hole and pass-through moving parts 335 and 336 which are rotatably coupled to one upper side of the path parts and move to allow quantitative contents to pass therethrough according to a change in posture of the container assembly.

A front moving member 335 of the pass-through moving part roughly closes the through hole in a non-operating state (in which the container assembly is inclined at a predetermined angle or less or stands upright). In addition, in the state in which the container assembly is inclined, the front moving member 335 is rotated in an outward direction of the through hole due to a weight of the contents introduced into the path 385 so that the contents may be discharged. Meanwhile, a rear moving member 336 is integrally formed with the front moving member 335, serves as a weight having a fan column shape, rotates with the front moving member 335 to close a rear of the path 385 so as to block the contents present in the rear from passing therethrough, and thus quantitative discharge is allowed. In this case, a central axis of rotation is positioned between the rear moving member 336 and the front moving member 335.

Meanwhile, as the screw-rotation of the first coupling part of the cap device is stopped at the designated portion of the container body, the front moving member is positioned at a desired portion of the body (for example, positioned at the upper portion connected to the flat portion of the quadrangular container), and thus there is an effect in that a pill, which moves to the front moving member along the inner portion of the body, smoothly slides or a hand conveniently holds the container body.

The bottom protruding part 380 is formed in one region of the bottom of the case 315 to protrude downward, and thus, in a state in which the cap device 300 is installed on the upper portion of the container 200, the cap device 300 closes at least a part of the open part of the neck part 220. An inclined part 381, which is inclined and extends upward, is formed at one side of the bottom protruding part 380 to constitute an inlet part through which the contents are introduced from the container body to the path 385. The inclined part 381 extends to a side wall 382 disposed thereabove and, along with a side wall 386 formed opposite to the side wall 382 and one surface of the rear moving member 336, forms the path 385 directed to the through hole in which the front moving member 335 is positioned. Since the bottom protruding part 380 closes the open part of the neck part of the container, the contents are guided to the narrow inlet part and the path 385 so that quantitative discharge is allowed.

According to one embodiment of the present invention, the cap body 310 is coupled so that the bottom protruding part 380 and a lower portion of the path 385 are inserted into the inner wall of the holder 320, the inner circumferential surface of the inner wall and an outer circumferential surface of the bottom protruding part 380 of the cap body are disposed to be spaced apart from each other by a predetermined distance, and the distance is determined by the stepped part 391. This is for securing a space in which the cap device 300 is rotationally coupled to the neck part 220 when the cap device 300 is installed on the container. That is, when a screw thread 321 formed on the inner circumferential surface of the inner wall of the holder 320 of the cap device 300 is rotationally coupled to the screw thread formed on the outer circumferential surface of the neck part, since the bottom protruding part 380 and the path 385 are disposed in the open part of the neck part, the contents accommodated in the container body may be moved and discharged to the outside only through the path 385.

According to one embodiment of the present invention, the bottom protruding part 380 is formed in one region of the bottom of the case 315 to protrude downward but is not limited thereto. That is, alternatively, the bottom protruding part 380 does not protrude in one region of the bottom of the case 315, is formed adjacent to the path to be horizontal or concave upward, along with the path 385, and may also form an opening blocking part which closes the open part of the neck part.

As described above, since the cap device 300 according to one embodiment of the present invention is rotationally coupled to the neck part of the container, the cap device 300 may be arbitrarily installed as necessary, and since the lid 400 is rotationally coupled to the cap device 300 again using the screw threads, the conventional container is used without change, and a quantitative discharge device or IoT device may be easily realized. According to the drawings of the present invention, since the lid 400 is designed to be greater than an outer circumference of the neck part, it may seem that the lid and the container are not compatible, but the cap device may be designed to be compatible with both conventional containers and conventional lids by adjusting a scale.

In the embodiment, the container has a quadrangular columnar shape, but the spirit of the present invention is not limited thereto, and the cap device may be installed on and applied to container bodies having various polygonal column shapes, elliptical columnar shapes, and cylindrical shapes.

According to another embodiment of the present invention, the holder 320 and the cap body 310 of the cap device 300 may also be integrally formed.

Meanwhile, as the cap device 300 is installed on the container 200, the container may have a function, but the cap device 300 is easily separated from the container 200 unintentionally due to a result of using screw rotation coupling for the sake of ease in installation and separation. Particularly, when the lid 400 rotationally coupled to the cap device 300 using the screw threads is opened, since rotation directions of the screws are the same, the cap device 300 is rotated therewith, and thus the coupling with the container 200 is easily released. In this case, when the cap device is unintentionally separated from the container, the open part of the neck part 220 is opened, and thus the contents are spilled.

In addition, when a child or infant turns the cap device to open the container, and the accommodated contents such as medicine are misused, it may lead to an accident, and thus a countermeasure thereagainst is required.

According to one embodiment of the present invention, as illustrated in FIG. 2, in the container assembly in which the cap device 300 is detachably installed on the container 200 using rotational coupling, the locking device 100 is fitted to and slidably moved from a lower end portion of the container 200 having the quadrangular columnar shape, and moved to almost a shoulder part of the container to insert rotation prevention protruding parts of the locking device 100 into insertion parts, that is, concave parts 322 and 342, of a lower portion of the cap device 300. In this case, the locking device 100 has a structure in which slidable and vertical movement is allowed along an outer circumferential portion of the container body but relative rotation movement along an outer circumference is not allowed. Accordingly, the rotation prevention protruding parts fixedly inserted into the concave parts prevent rotation of the cap device rotation-coupled to the neck part.

Hereinafter, the locking device of the present invention will be described in detail with reference to FIGS. 3 to 7.

The locking device 100 of the present invention is a device for preventing separation between the cap device and the container, which constitute the container assembly, by preventing separation, due to rotation, of the cap device from the container assembly in which the cap device 300 is detachably installed onto the container 200 using rotational coupling.

The locking device 100 includes a band part 140 and a rotation prevention part coupled to the band part. The band part 140 has a shape into which the container body 210 having the quadrangular columnar shape for accommodating the contents of the container 200 is inserted and in which the container body 210 is vertically movable. According to the embodiment of FIG. 3, the band part 140 may be formed as a band having a quadrangular loop shape and formed of a material such as plastic or a metal. The band part has a predetermined rigidity so that the loop shape may be fixedly maintained even when an external force is applied thereto, and the band part has a small elastic force and is fitted to the circumference of the container 200 so that the band part has a frictional force against an outer wall of the container body and is vertically movable in a sliding manner.

The band part 140 is a loop shaped member having an inner circumferential portion corresponding to a shape of the outer circumferential portion of the container body 210 of the container and having a predetermined vertical height. Although a shape of an outer circumferential portion of the band part is not specifically limited, the inner circumferential portion is fitted to the outer circumferential portion of the container body and is vertically movable in a sliding manner but is not allowed to relatively rotate with respect to the container body.

In FIGS. 1 to 7, a shape of the container body 210 of the container is illustrated as the quadrangular shape or quadrangular shape of which corners are rounded but is not limited thereto, and may be one of various polygonal shapes, and it is sufficient for a shape not to allow lateral rotation with respect to the container body in a state in which the container body 210 is fitted to the band part 140. Accordingly, when the container body 210 has an elliptical columnar shape, the band part having the same elliptical loop shape may serve as the locking device of the present invention.

Hooks 110 are integrally formed with the upper end of the band part 140 and inserted into and hook-coupled to first concave parts 322 formed at an edge of a bottom of the cap device 300. The hooks 110 include protruding parts 112 which are formed to protrude upward from the upper end of the band part and have a rectangular columnar shape and hook protrusions 111 formed on upper ends of the protruding parts 112. The hook protrusion 111 is formed to obliquely protrude from the upper end of the protruding part 112 outward with respect to the band part 140.

The hook 110 is inserted into the first concave part 322 formed at a position, which corresponds to the hook 110, on a bottom of the holder 320 of the cap device so that the cap device 300 and the locking device 100 are fixedly hook-coupled to each other.

Figure 7:
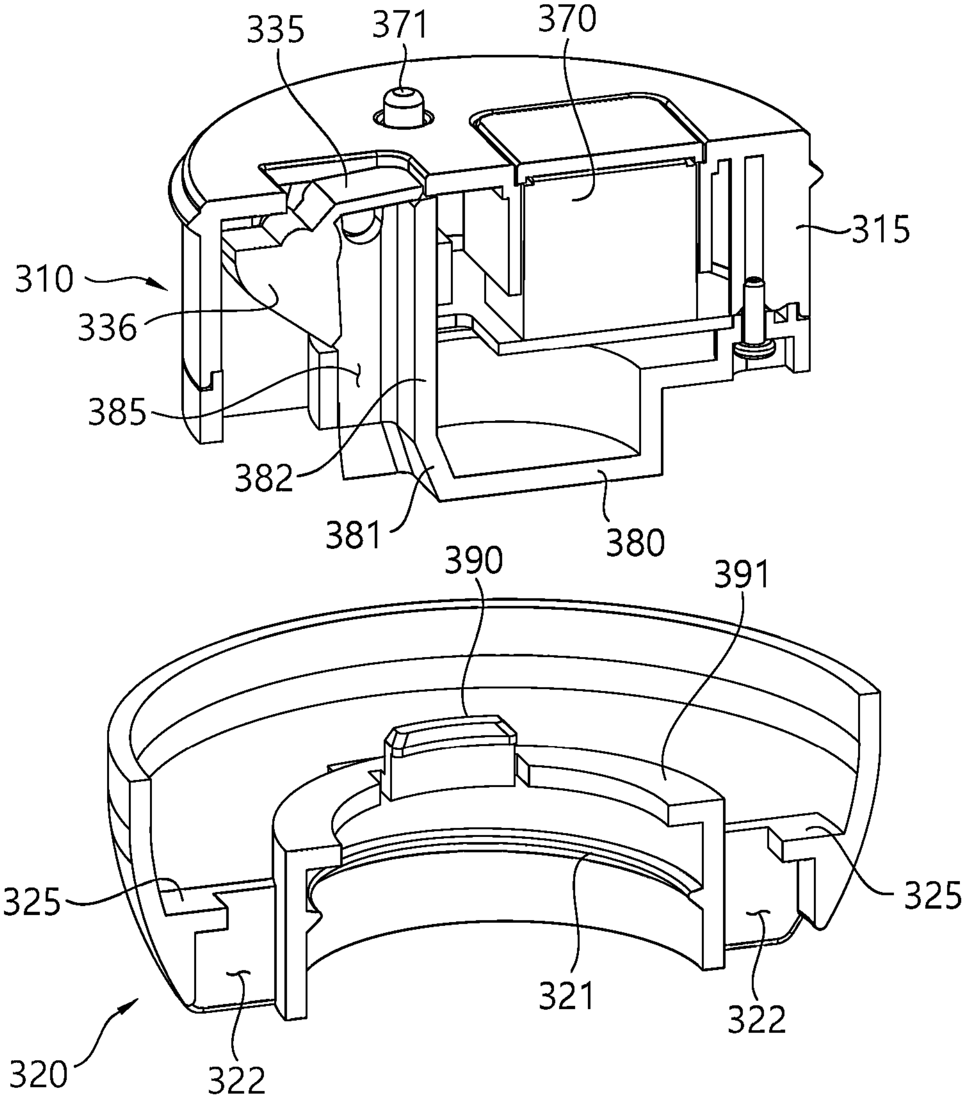
FIG. 7 is an exploded perspective view illustrating the cap device of the present invention cut in a longitudinal direction.
Figure 8:
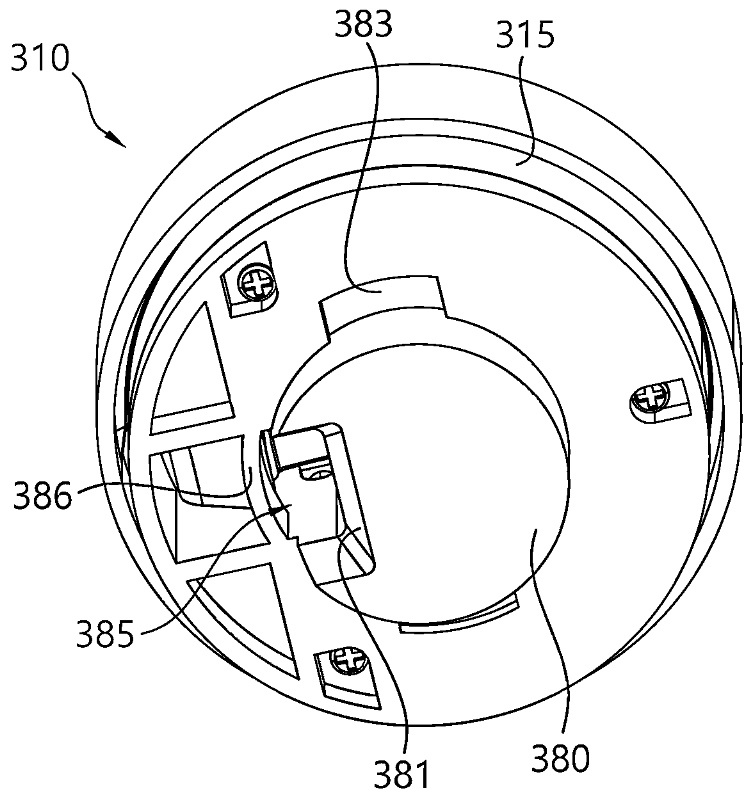
FIG. 8 is a perspective view illustrating a bottom of a cap body of the cap device of the present invention.
Figure 9:
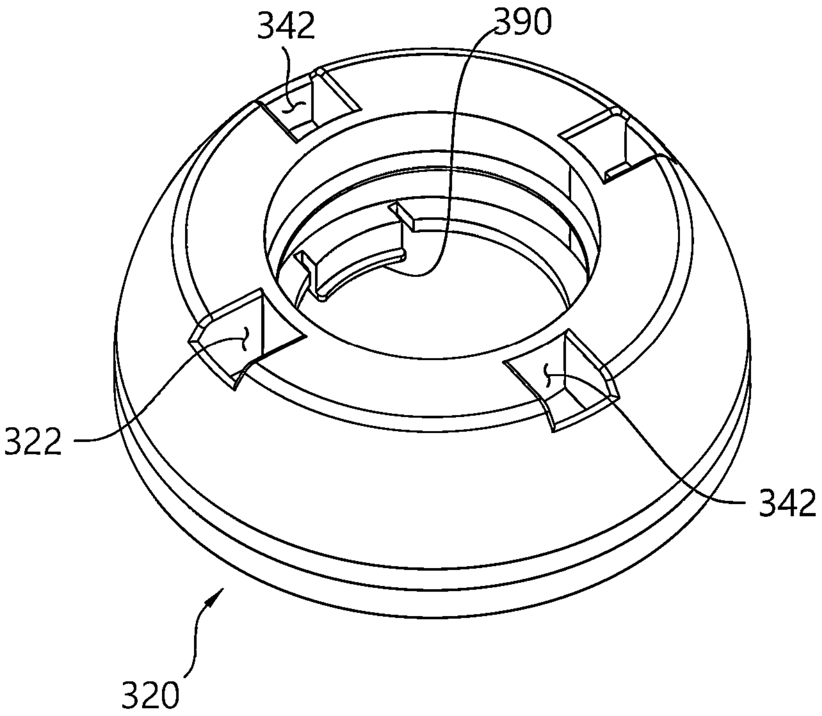
FIG. 9 is a perspective view illustrating a bottom of a holder of the cap device of the present invention.
Figure 10:
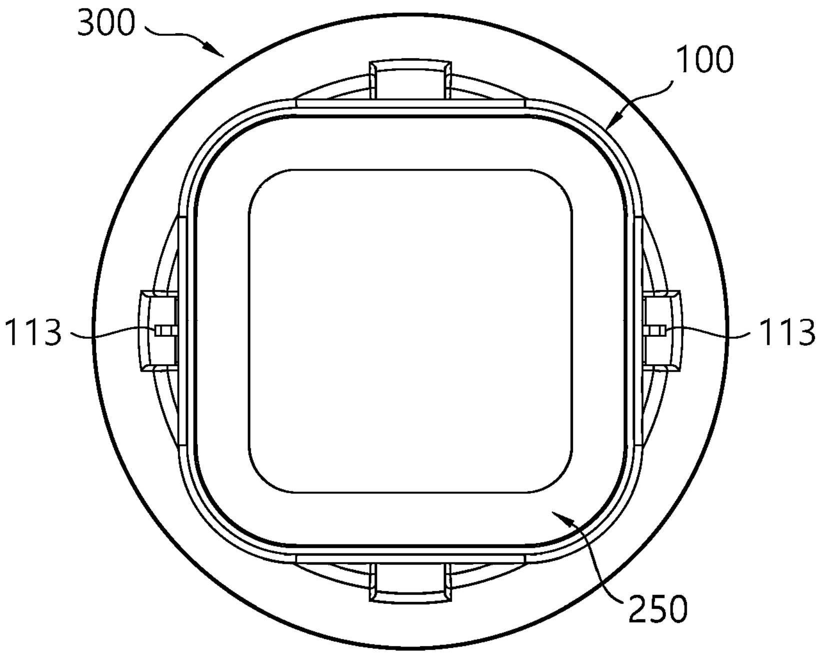
FIG. 10 is a bottom view illustrating a state in which the locking device is coupled to the storage container assembly according to one embodiment of the present invention when viewed upward from a bottom (250) of a container body.

The first concave part 322 has a quadrangular container shape concavely formed upward from the bottom of the holder 320, and in FIG. 9 which is a perspective view illustrating the bottom of the holder of the cap device of the present invention, the first concave parts 322 and second concave parts 342 formed in the bottom part of the holder 320 are illustrated. Among them, the first concave part 322 has a through hole shape as illustrated in FIG. 7, and hooking steps 325 protruding in an inward direction of the concave part 322 are formed at one sides of the upper ends thereof.

Hook coupling is performed in a manner in which the inner circumferential surface of the band part 140 is engaged with an outer circumferential surface of the container body of the container, slidably moves upward, and reaches the shoulder part of the container, the hook 110 of the locking device 100 is inserted into the concave part 322 of the holder 320, the hook protrusion 111 of an upper end of the hook passes through the through hole, and a bottom of the hook protrusion 111 is hooked on the hooking step 325.

As illustrated in FIGS. 3 to 5, two hooks 110 are formed to extend upward from two sides, which face each other, of the quadrangular band part 140, and the first concave parts 322, into which the hooks 110 are to be inserted, are formed at positions, which are opposite to each other on a circumference of a cylindrical inner wall, of the bottom part between the cylindrical inner wall and the outer wall of the holder 320. Two hooks 110 are not necessarily required, one or more hooks 110 may be provided, and the hooks 110 may also be formed on all of upper ends of four sides of the quadrangular band part. In this case, the concave parts having through holes may be formed at positions, which correspond to positions of four hooks 110, of the holder so that the locking device and the cap device may be coupled by the hook coupling performed at four positions.

A distance between both side surfaces of a first protruding part is the same as a lateral length of the first concave part 322 excluding a tolerance so that the both side surfaces of the first protruding part are in contact with lateral walls of the first concave parts. However, for the sake of convenience in hook coupling and releasing therefrom, the first concave part 322 may have a predetermined gap from the first protruding part in a radial direction toward a central axis of the holder 320.

On the hooks 110, pressing protrusions 113 are formed on outer circumferential surfaces of the protruding parts 112 to extend vertically. The pressing protrusion 113 is particularly useful when, in a state in which the hook protrusion 111 is inserted into and hook-coupled to the first concave part 322, the hook coupling is released to release the locking device as necessary. A user, who wants to lock the cap assembly using the locking device including the quadrangular band part 140 in which two hooks are formed opposite to each other, slidably moves the locking device upward in a state in which the container body 210 is inserted into a loop of the band part 140 of the locking device and inserts the hooks 110 into the concave parts to hook-couple the cap device and the locking device 100.

Then, when the user wants to release the coupling and when the user presses the pressing protrusions 113, which are formed on outer sides of two hooks 110 disposed opposite to each other, with two fingers and slightly moves the band part downward, the hook coupling may be easily released.

Meanwhile, cut portions 130 are formed at both sides of the hook 110 to provide movement flexibility of the hook 110, particularly, movement flexibility in a radial direction toward a loop center and the outside so that the hook coupling and the releasing therefrom are further facilitated.

Meanwhile, in addition to the hooks 110, second protruding parts 120 are additionally formed on the upper end of the band part 140. According to the embodiment of FIGS. 3 to 8, the second protruding parts 120 are formed on sides, which face each other and on which the hooks 110 are not formed, of the quadrangular band part 140. The second protruding part has a simple rectangular columnar shape, in which a hook protruding part is not formed, and extends upward from the upper end of the band part 140 like the hook 110. Second concave parts 342, into which the second protruding parts 120 are inserted, are formed at positions, which are opposite to each other on the circumference of the cylindrical inner wall, on the bottom part between the cylindrical inner wall and the outer wall of the holder 320.

Although the second concave part 342 may be formed as a through hole, the second concave part 342 may not be the through hole, and a hooking step may also not be formed. However, both side surfaces of the second protruding part 120 are tightly fitted between both side surfaces of the second concave part to prevent the holder from relatively rotating with respect to the locking device in a state in which the second protruding part 120 is inserted into the second concave part 342. That is, a length between both side surfaces of the second protruding part is the same as a lateral length of the second concave part excluding a tolerance so that both side surfaces of the second protruding part are in contact with lateral walls of the second concave part. However, the second concave part 342 may have a predetermined gap from the second protruding part in the direction toward the central axis of the holder 320.

As described above, the locking device 100 includes the band part 140 formed as a loop having a shape which is the same as a shape of an outer circumference of the container and the protruding parts which are coupled to the band part 140 and extend upward. The protruding part is formed to be inserted into the concave part formed in the cap device, the protruding part is formed as the plurality of protruding parts, at least one protruding part is inserted into and hook-coupled to the corresponding concave part as a hook structure, and some of the protruding parts are slidably coupled to the corresponding concave parts of a rotation coupling module without a hook structure.

The cap device 300 may be rotationally coupled to the container 200 and may be rotated to open or close the open part of the container. However, since the protruding part integrally coupled to the band part or protruding part coupled to the band part of the locking device to have a predetermined strength is inserted into or hook-coupled to the concave part formed in the cap device, rotation of the cap device 300 is prevented, wherein the locking device is slidably movable only vertically with respect to the container and is not allowed to be relatively rotated with respect to the container. That is, since the locking device is fitted upward from a bottom part of the medicine container having the quadrangular columnar shape and is hook-coupled to the lower end portion of the cap device, the rotation is prevented due to the quadrangular shape of the medicine container having the quadrangular columnar shape, and the cap device hook-coupled to the locking device is also prevented from being rotated so that the cap device is not opened.

The locking device, which is formed in a loop shape and has an inner circumferential portion matching the outer circumference of the container, slides upward along the container to hook-couple the protruding hook to the concave part formed in the lower portion of the cap device so that the cap device is fixed to prevent coupling release due to rotation. In addition, as necessary, the hook coupling may be released by pressing the hook or pressing the pressing protrusion of the hook, and locking may be released by sliding the locking device downward. Accordingly, the container may be opened by rotating an upper rotational coupling module be separated from the container.

The locking device of the present invention provides a locking structure capable of locking the cap device on the container and releasing the locking as necessary so that unintended coupling release of the detachably installed cap device is prevented when a container cover is opened. In addition, the locking device, which has excellent adaptability and versatility applicable to conventional containers and is economical, is provided.

While the present invention has been described above with reference to the exemplary embodiments, it may be understood by those skilled in the art that various modifications and changes of the present invention may be made within a range without departing from the spirit and scope of the present invention defined by the appended claims.

The invention claimed is:

1. A cap device to be detachably installed on a container using rotational coupling including a container body in which the contents are accommodated and a neck part extending on an upper end of the container body, the cap device comprising:

a first coupling part to be rotationally coupled to the neck part to detachably couple the cap device to the container using rotational coupling; and a pass-through device through which the contents accommodated in the container body pass, wherein a locking device is provided for the cap device, the locking device including a loop-shaped band part and a locking part to be coupled to the cap device, wherein the loop-shaped band part has an inner circumference of polygonal or elliptical shape matching an outer circumference of the container body having a polygonal or elliptical column shape so that the loop-shaped band part is vertically movable in a sliding manner along an outer circumference of the container body and is not allowed to relatively rotate along the outer circumference of the container body, in the state in which the container body is fitted to and inserted into the band part of the locking device and the locking part is coupled to the cap device.

2. The cap device of claim 1, wherein:

the cap device is coupled to a content storage container including the container for accommodating the contents and a lid; and the cap device includes a second coupling part to be coupled to the lid.

3. The cap device of claim 1, wherein the first coupling part is a screw thread which is screw-coupled to a screw thread formed on a neck part which has an open part formed in an upper portion of the container.

4. The cap device of claim 3, wherein:

the cap device includes a holder on which the first coupling part is formed and a cap body including the pass-through device;

the holder includes a cylindrical inner wall and a bottom part extending from a bottom of the cylindrical inner wall along an outer circumference thereof; and the first coupling part is formed on an inner circumferential surface of the cylindrical inner wall and screw-coupled to the neck part.

5. The cap device of claim 4, wherein:

the first coupling part is the screw thread formed on the inner circumferential surface of the cylindrical inner wall and is engaged with, rotationally coupled to, and released from the screw thread formed on an outer circumferential surface of the neck part;

the cap body includes a case and the pass-through device accommodated in the case; and a bottom protruding part inserted into an open part formed by the cylindrical inner wall is formed on a bottom of the case.

6. A container assembly comprising:

a container configured to accommodate contents;

a cap device detachably installed on the container; and a locking device, wherein the container includes a container body in which the contents are accommodated and a neck part formed on an upper end of the container body, wherein the cap device includes a first coupling part rotationally coupled to the neck part to detachably couple the cap device to the container using rotational coupling, wherein the locking device includes a loop-shaped band part and a locking part, wherein the loop-shaped band part has an inner circumference of polygonal or elliptical shape matching an outer circumference of the container body having a polygonal or elliptical column shape so that the loop-shaped band part can slide upwards along the outer circumference of the container body and from bottom of the container body, and is not allowed to relatively rotate along the outer circumference of the container body, and wherein the locking part integrally formed with the band part is hook-coupled to the cap device to prevent rotation of the cap device rotation coupled to the neck part.

7. The container assembly of claim 6, wherein the first coupling part of the cap device is rotationally coupled to a screw thread formed on an outer circumferential surface of a neck part of the container.

8. The container assembly of claim 6, wherein:

the cap device includes a holder on which the first coupling part is formed and a cap body including the pass-through device;

the holder includes a cylindrical inner wall and a bottom part extending from a bottom of the cylindrical inner wall along an outer circumference thereof; and the first coupling part is formed on an inner circumferential surface of the cylindrical inner wall and rotationally coupled to the neck part.

9. The container assembly of claim 6, wherein the container assembly further includes a lid;

the lid is rotationally coupled to an outer circumferential surface of an upper portion of the cap device; and the lid is rotationally coupled to an outer circumferential surface of the neck part of a container in a state in which the cap device is separated from the container.

10. The container assembly of claim 6, wherein:

the locking part is a rotation-preventing protrusion coupled to the band part.

11. A locking device which prevents separation between a container including a container body in which the contents are accommodated and a neck part formed on an upper end of the container body and a cap device detachably coupled to the container, the locking device comprising:

a band part having a loop shape; and a locking part prevent relative movement of the cap device with respect to the container, wherein the cap device is detachably coupled to the neck part using rotational coupling, wherein the band part has an inner circumference of polygonal or elliptical shape matching an outer circumference of the container body having a polygonal or elliptical column shape so that the band part can slide vertically along the outer circumference of the container body and is not allowed to rotate with respect to the container body, and wherein the locking part is formed integrally with the band part to be hook-coupled to the cap device.

12. The locking device of claim 11, wherein:

the band part has an inner circumferential surface in contact with an outer circumference of the container body and has a predetermined strength; and the locking part is a rotation prevention protruding part and is fixedly inserted into the cap device to restrict rotational movement of the cap device with respect to the container body.

13. The locking device of claim 11, wherein:

the locking part includes a hook extending to protrude upward from an upper end of the band part.

14. The locking device of claim 11, wherein:

the locking device is for a cap device which is rotatably coupled to the container body and opens or closes an open part formed in the neck part; and the band part is insertion-coupled to the container body, is slidably movable along the container body, and does not rotate with respect to the container body.

15. The locking device of claim 11 is integrally formed of a metal or plastic.

* * * * *